Sept. 20, 1932.  S. D. LOCKE ET AL  1,878,943
AUTOMOBILE BODY
Filed March 3, 1928   7 Sheets-Sheet 1

Sept. 20, 1932.   S. D. LOCKE ET AL   1,878,943
AUTOMOBILE BODY
Filed March 3, 1928   7 Sheets-Sheet 5

INVENTOR.
Sylvanus D. Locke.
BY Henry J. Stegeman.
ATTORNEY.

Patented Sept. 20, 1932

1,878,943

UNITED STATES PATENT OFFICE

SYLVANUS D. LOCKE, OF BRIDGEPORT, AND HENRY J. STEGEMAN, OF FAIRFIELD, CONNECTICUT

AUTOMOBILE BODY

Application filed March 3, 1928. Serial No. 258,909.

This inventon relates to vehicle bodies and has for its primary object the providing of an automobile body which may be easily and quickly converted from a "closed" to an "open" type, or vice versa.

An additional object is to produce an automobile body having the characteristics stated and which can be as effectively closed against the weather as the types of closed machines now in general use, and which may be opened to give the advantages of the "open" type of body.

A more specific object of the invention is to provide a body such as has been described, including means whereby the roof may be displaced from its active position so as to permit the entrance of sun and air, without interfering with the positioning of the rear light panel, or in any other way detracting from the appearance or usefulness of the car.

A further object is to provide novel means for manipulating the roof either to active or inactive position.

Additional objects and advantages will become apparent from a study of the following detailed description, taken in connection with the accompanying drawings, showing an operative embodiment of the invention. The drawings and the following detailed description are by way of illustration, and not by way of limitation, and for a definition of the invention, reference must be had to the annexed claims. Many changes in the construction and arrangement of parts will readily suggest themselves, but such changes are considered part of the invention, when they fall within the scope of the appended claims.

Referring to the accompanying drawings:—

Referring in detail to the drawings, 10 indicates in its entirety an automobile equipped with the present invention. The body includes side frame members 11 and 12 connected at their upper front and rear portions by curved, transversely extending guide and bracing members 13 and 14 respectively. A front frame member 15 includes a windshield 16 and at 17 is the rear frame member. The roof is designated 18, and when in its inoperative position, that is, when an open car is desired, the roof is stored in a housing 19 in the upper rear portion of the automobile.

Each side member 11 and 12 preferably includes a window 20 and a door 21, having a glass 22, the window and door preferably fitting into the permanent structure of the body, including the uprights 23, 24 and 25 of the side members. At their upper ends, these uprights are connected by an arch or beam 26, extending longitudinally of the body, and defining the upper, desirably approximately horizontal, margin of the side members of the frame.

A continuous water channel or trough 27 extends from adjacent the front guide member 13 through the upright 23 and beam 26 to the housing 19. The beam 26, and the forward upright 23 carry an inwardly extending strip 28, secured to the outer face of the beam, and to the forward face of the upright, as by screws 29. This continuous strip fits against the beam and against the upright 23, at the outer edge 30 of the channel or trough 27, to define a guide way 31, disposed outwardly or above the open side of the trough, and in communication therewith. Since the guide ways 31 of the side members are adapted to slidably receive the opposite edges of the roof or cover member 18, they are disposed to face each other.

The forward and rear guide members 13 and 14 respectively constitute tie pieces between the side frame members and are disposed just below the guide ways 31 to furnish support for the roof or covering member, and provide a smooth surface over which it may slide when being moved to operative or inoperative position.

Beneath the forward guide member 13, the windshield structure 16 is disposed, this structure including a windshield 32 hinged at 33, to a part of the body in any desired manner.

A transverse stop 34 is adapted to be engaged by the front end of the roof or covering member 18, when the same is in use, the transverse stop being secured to the lower portion of the curved guide member 13 by screws or the like, 35. The transverse stop includes a forwardly bent upper portion 36 providing with the forward guide member 13, a transverse stop for the front portion of the roof 18.

Preferably the roof or covering member consists of some pliable or flexible water proof material 37, such as canvas, leather, or the like, and to the inner face of which, slats 38 are secured. These slats may be of any substantial material and are arranged in spaced relation to extend transversely of the body. When disposed in the housing 19, the roof is wound about a windup roller 39 which is mounted in the housing, and extends transversely of the body.

Figure 1:
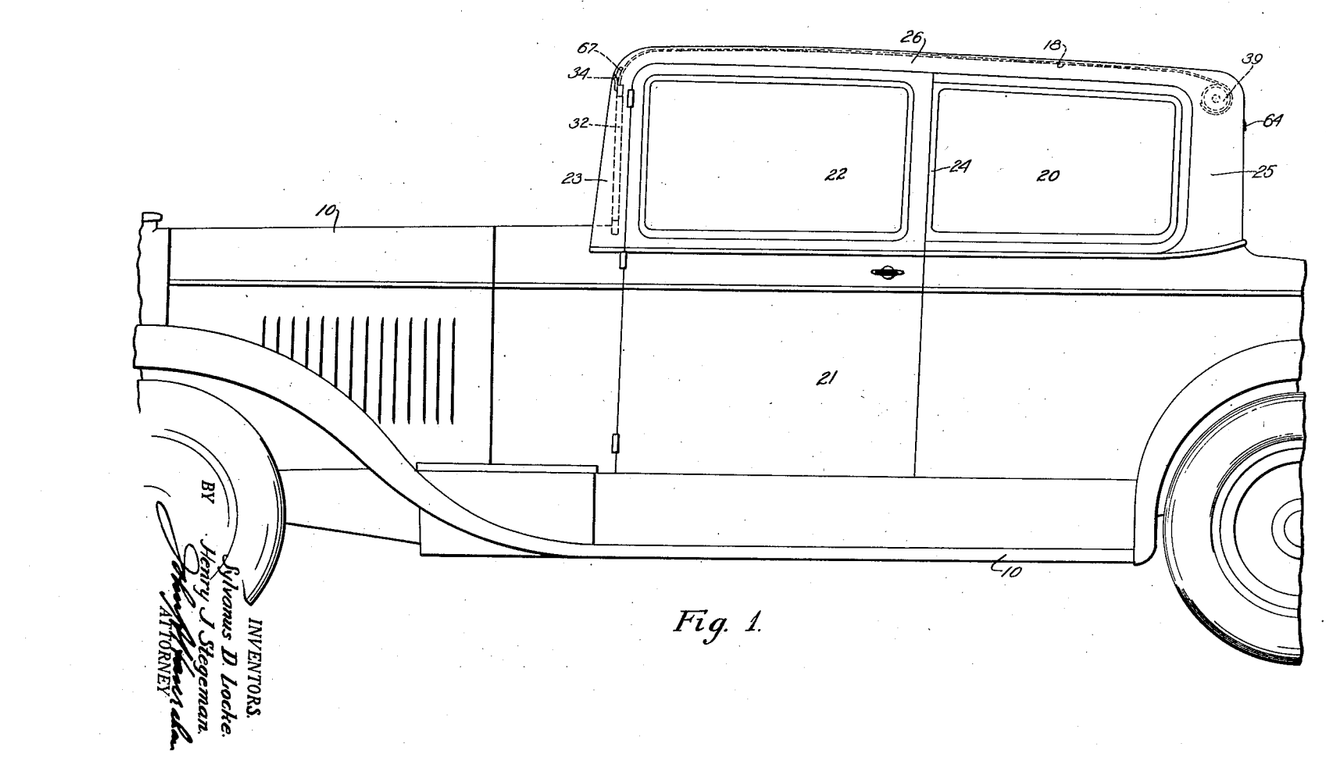
Fig. 1 is a side elevational view of an automobile equipped with a body in which the features of the invention are incorporated.
Figures 2, 5:
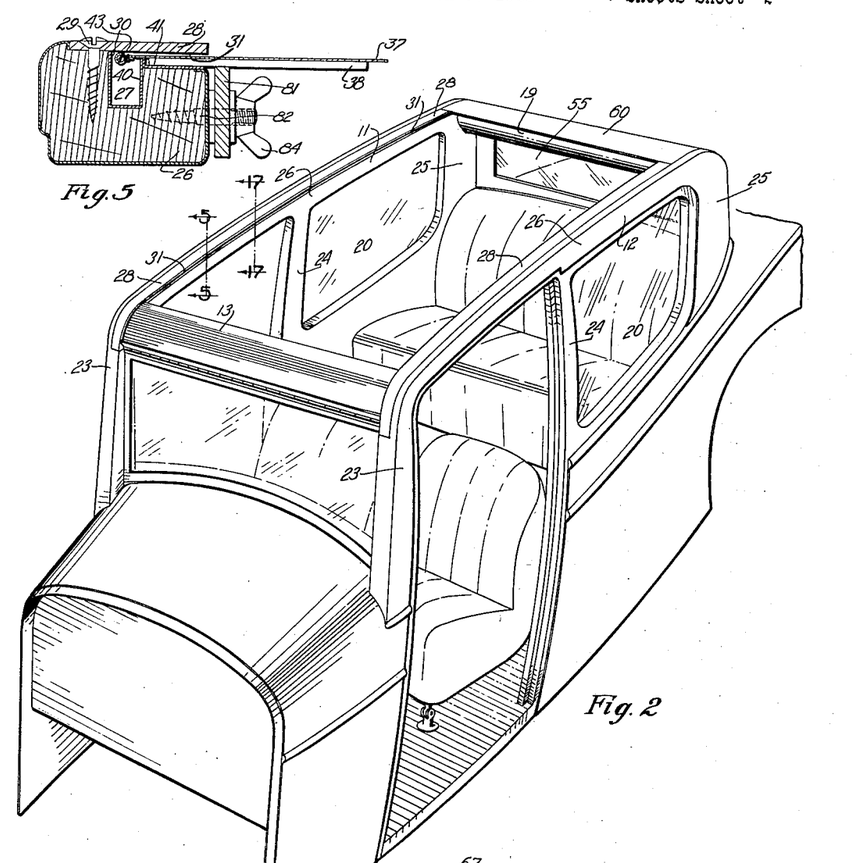
Fig. 2 is a perspective view showing the general construction of the improved body, with roof and doors removed.
Fig. 5 is an enlarged vertical sectional view on line 5—5 in Fig. 2.
Figure 3:
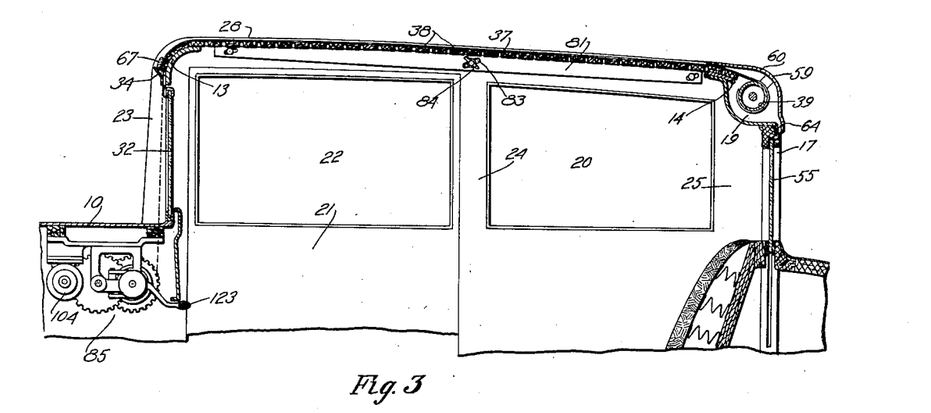
Fig. 3 is a partial longitudinal sectional view through the body.
Figures 8, 9, 10, 11:
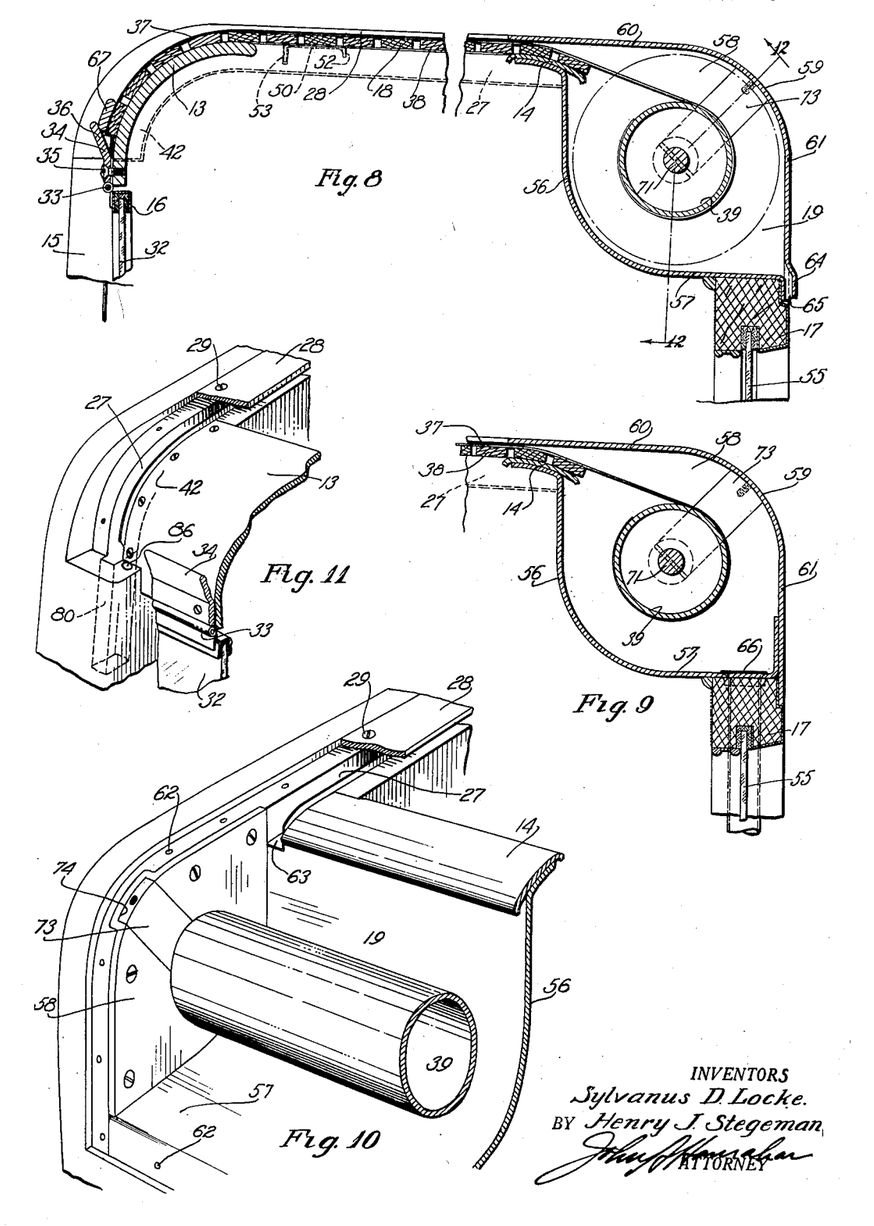
Fig. 8 is an enlarged sectional view through the body, detailing the frame rear, side, and front members, the roof or covering member, the windup roller, and guide plates of the body for said roof or covering member.
Fig. 9 is an enlarged fragmentary sectional view corresponding with the showing at the right side of Fig. 8, disclosing a modified construction of means for conducting water from the rear frame member of the body.
Fig. 10 is a fragmentary perspective view detailing the structure of the rear corner of the top.
Fig. 11 is a fragmentary perspective view detailing the structure of one forward corner of the top.
Figure 12:
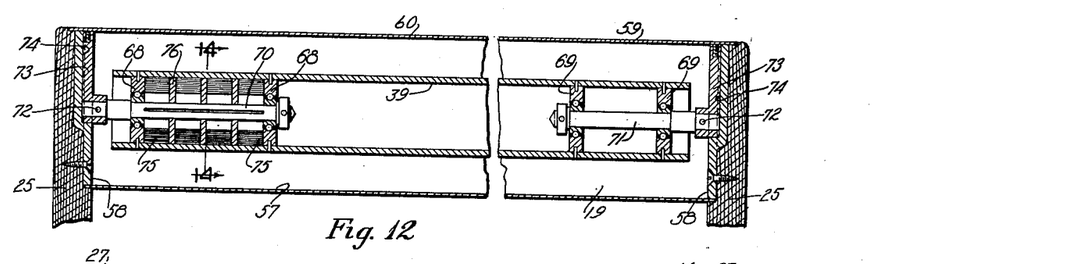
Fig. 12 is a sectional view through the rear frame member, its cover plate, and the windup roller, as on line 12—12 in Fig. 8, the roof being omitted.

As is probably best shown in Fig. 5, the inner wall 40 of the trough 27 is of less height than the outer wall thereof, and the arch 26 terminates short of the free edge of the wall 40, as at 41, and the forward uprights 23 terminate in like manner at the rear of the forward edges of the inner walls, as indicated at 42 (Fig. 11).

The marginal edge portions of the material 37 extend beyond the slat ends, while the end portions of the slat 38 rest upon the portions 41 and 42, with their ends terminating adjacent the inner walls of the troughs, whereby movement of the slats transversely of the body is prevented. With the parts arranged as stated, the edge portions of the material 37 immediately beyond the ends of the slats, are in close proximity to the edges of the inner walls 40 and the troughs.

Figure 6:
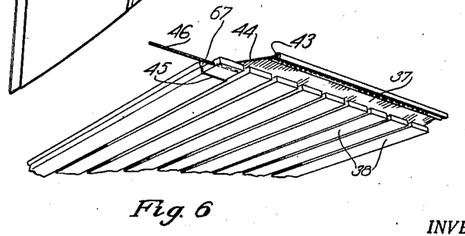
Fig. 6 is a detail view of the forward end portion of the roof or covering member.
Figure 7:
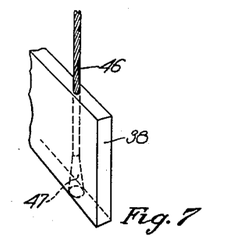
Fig. 7 is a detail view of the cable connection to the roof or covering member.

The marginal edges of the material 37 include cords 43, and terminate beyond the inner walls of the channels or troughs. At its forward edge, this material is secured about the foremost slat 38 (see Fig. 6) and just back of this slat, the cords 43 terminate. To prevent buckling or creasing of the material 37, its marginal edges are cut away so as to extend obliquely inward, as at 44 from the location of the cord ends, and the material around the front slat terminates short of the slat ends, as at 45. Cables 46 are passed through the end portions so the front slat ends are adapted to be manipulated to control the position of the covering member 18. The end of each cable passes through the slat and has a tapered fit therein, as shown in dotted lines at 47, in Fig. 7.

Figures 17, 18, 19, 20, 21:
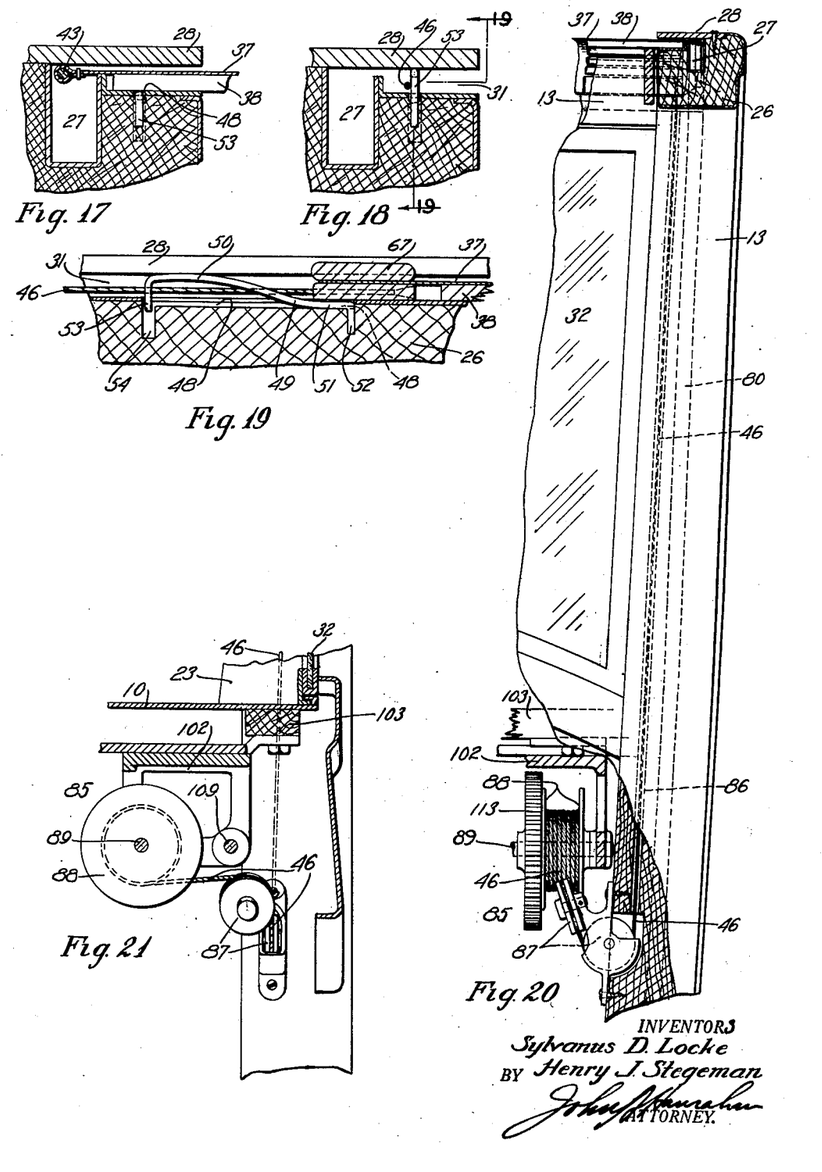
Fig. 17 is an enlarged vertical sectional view on line 17—17 in Fig. 2, detailing the cable guide devices and disclosing the roof as when the body is "closed"
Fig. 18 is a view corresponding with the disclosure of Fig. 17, the roof being in position as when the body is "open"
Fig. 19 is a sectional view as on line 19—19 in Fig. 18.
Fig. 20 is a fragmentary elevational view, partially in section, looking toward the front right door post, detailing features of the roof manipulating and controlling mechanism.
Fig. 21 is a fragmentary view, partially in section and partially in elevation, as seen from the left in Fig. 20.
Figure 22:
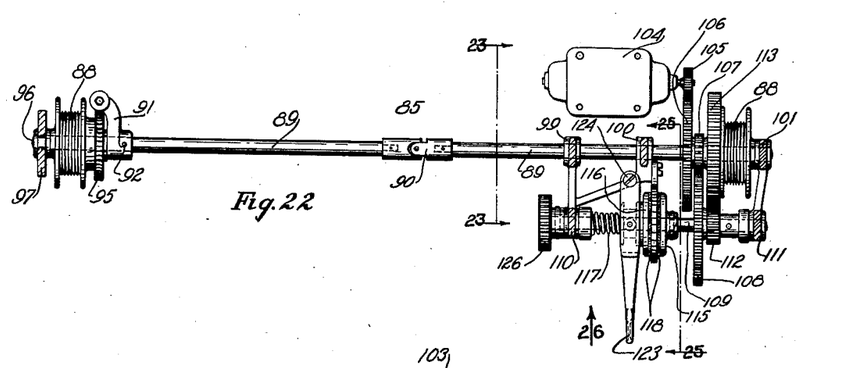
Fig. 22 is an enlarged plan view, corresponding with the showing at the left side of Fig. 4, detailing features of the roof manipulating and controlling mechanism.
Figure 23:
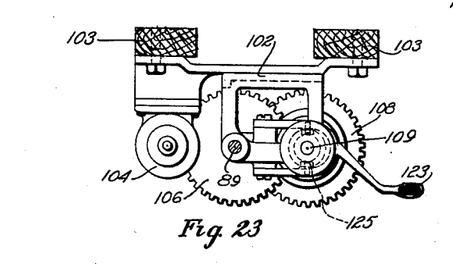
Fig. 23 is a sectional view as on line 23—23 in Fig. 22.

Referring more particularly to Figs. 17 to 19, grooves 48 are provided in the lower faces of guide ways 31, and a guide means 49 for the cables is secured in said groove. Each means 49 comprises a spring arm 50, having a portion 51 resting upon the side frame member, and having its adjacent portion imbedded in said member. The opposite end 53, of the guide means, is movable in a vertical slot 54, and these guide means are provided in the opposite guide ways spaced apart a distance less than the distance between the opposite cables 46.

When the roof is moved over the guide devices, they are merely depressed as shown in Fig. 17, the end 53 moving downwardly in the slot 54. As soon as the roof passes off these devices, they move upwardly to the positions shown in Figs. 18 and 19, the end 53 never being entirely removed from the slot 54. This being true, the cables are prevented from moving out of the guide ways 31, as they might otherwise do.

The rear frame member 17 includes a window 55 which is preferably openable. A portion of said member above the window comprises a front wall 56 and a bottom wall 57, of the housing 19. The remainder of the housing includes ends 58 and a cover plate 59 constituting the top wall 60, and the rear wall 61 of the housing. At its forward portion, the wall 56 fits under the rear guide plate 14, while the side edges of the wall 56, and the bottom wall 57 are secured in any convenient manner to render these parts of the housing water-tight, as, for example, by welding, to the inner faces of the uprights 25. Screws entering holes 62 may be used for securing the cover plate 59.

As will be most clear from inspection of Fig. 10, the rear end portions 63 of the troughs 27 open directly into the housing 19. These rear end portions continue past the front wall 56 of the housing, and terminate within the latter.

Figure 13:
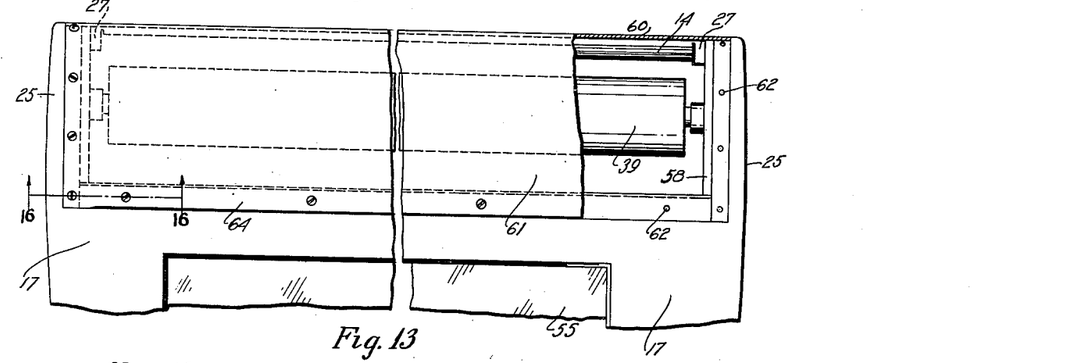
Fig. 13 is a fragmentary rear view of the upper portion of the body, parts being broken away and in section.
Figure 14:
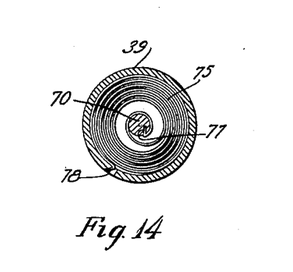
Fig. 14 is a sectional view of the windup roller, as on line 14—14 in Fig. 12.
Figure 16:
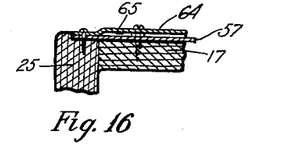
Fig. 16 is a fragmentary sectional view on line 16—16 in Fig. 13.

Preferably, the bottom wall 57 of the housing inclines downwardly and rearwardly, and, in Figs. 8, 13 and 16, we have shown the lower part of the rear wall 61 off-set at 64 to provide a water outlet 65, adapted to permit passage of water to the ground. In Fig. 9, a modification is shown wherein water outlets 66 comprise pipes leading down through the frame rear member 25 to the ground.

The windup roller includes a winding spring of ordinary or preferred construction for normally holding the roof wound up in the housing 19, or tending to wind up against the action of the roof manipulating mechanism, the windup roller thus insuring that the roof is stretched taut in use. As disclosed in Fig. 8, the upper face of the forward end portion of the material 37 has fixed to it a transversely disposed stopping bar 67 which lies snugly in the transverse seat 36 when the covering member is in use.

As will be apparent from Figs. 8 and 9, the inner marginal portion of the fabric material 37 is secured to the hollow cylinder of the windup roller in any convenient manner to insure that the roof or covering member can lie smoothly upon said hollow cylinder.

As disclosed, the windup roller is a hollow cylinder having spaced bearings, denoted 68 and 69, respectively, fixed in its opposite end portions. A short shaft 70 is suitably mounted against endwise movement in the bearings 68, and a short shaft 71 is suitably mounted against endwise movement in the bearings 69. The outer ends of the short shafts 70 and 71 are fixed, as at 72, to locking plates 73 removably fitted in obliquely disposed depressions 74 in the ends 58 of the housing 19. When the locking plates are at the bases of the depressions, the upper ends of said locking plates are, preferably, flush with the upper edges of the rearward uprights 25 so that the cover plate can fix said locking plates against movement.

A plurality of coil springs 75 between the bearings 68 together constitute the winding spring of the windup roller. Discs 76 upon the shaft 70 separate the coil springs, and the opposite ends of each coil spring are connected to the short shaft 70 and to the hollow cylinder as denoted at 77 and 78, respectively.

Figure 15:
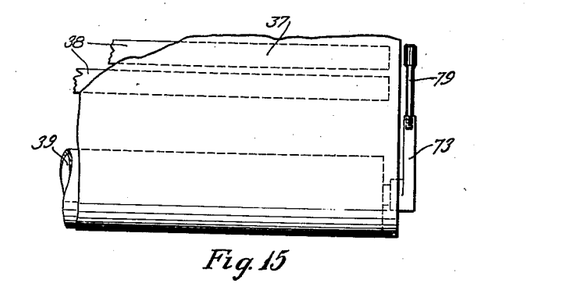
Fig. 15 is a fragmentary plan view of the windup roller and roof removed from the body, a withdrawing tool being shown.

When it is desired to adjust the tension of the windup roller, which operation is well known, withdrawal tools, represented 79 in Fig. 15, may be turned into threaded openings in the outer ends of the locking plates, and thus said plates, with windup roller, may be easily removed from the housing, as will be evident.

The continuous channels or troughs 27 as disclosed terminate at their front ends well down into the forward uprights 23, numeral 80 representing water outlets extending down through said forward uprights from the location of the forward ends of the channels or troughs to convey forwardly flowing seepage water to the ground. See Fig. 11.

It will be plain from the drawings that the major portion of water, as from rain or snow, landing upon the roof of the improved automobile body, will pass off, either forwardly or rearwardly, on the outside of the windshield structure, the outside of the cover plate 59, or beneath said cover plate and above the part of the roof 38 within the housing; that is to say over the roof and beneath the cover plate, and thence to the outlet at the rear end of the bottom of the housing.

Certain water, however, which we have preferred to call "seepage" water, will necessarily pass off of the side margins of the material 37, via the guide ways 31, directly into the continuous channels or troughs 27. Some of this seepage water will flow rearwardly through the channels or troughs, and some will flow forwardly. The seepage water flowing rearwardly will, obviously, all be conveyed directly to the housing 19, beneath the roof, and thence out through the drainage opening or openings at the rear of the bottom of said housing. Water flowing forwardly will all be conducted directly to the outlets 80 in the forward uprights 23. The forward parts of the side marginal portions of the material 37 having the cords 43 can, naturally, terminate short of the transverse stop 34, the forward guide member 13 itself here providing a water stoppage and the forward slats 38 having their end portions within the forward parts of the continuous guide ways 31.

It will be most clear from Fig. 5 that the outer margins of the material 37 are arranged to dip into the continuous channels or troughs 27 a distance insuring that the dripping points of said outer margins will be at elevation lower than the elevation where the guide ways 31 communicate with said channels or troughs, to make certain that the passage of seepage water from the roof, via the guide ways, will be directly to the drainage channels or troughs, and not around the outer margins of the material 37 back to the guide ways below said material 37 to the body interior.

When desirable, lengthwise locking strips 81 may be utilized, to make more certain that there will be no rattling of the roof or cover member. These strips are secured upon the inner faces of the side members by means of screws 82 arranged in diagonal slots 83 in the strips, the screws having clamping nuts 84. With this structure, the locking strips may be locked upon the screws and fastened by the nuts to hold the roof member outwardly and upwardly, or there may be direct connection between said strips and the slats 38, whereby the slats may be locked down against the surfaces 41.

Figure 4:
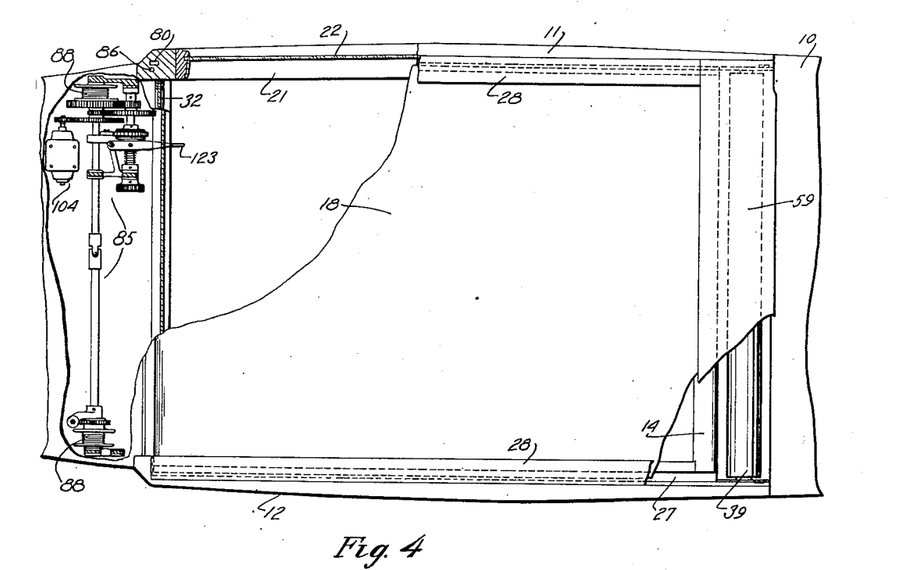
Fig. 4 is a fragmentary plan view of the body.

Mechanism at the front of the improved body, below the windshield structure, for manipulating and controlling the cables 46, is represented generally at 85. The uprights 23 may have guides 86 for the cables 46 (see Figs. 4 and 11), and said cables can lead over suitably placed idlers 87, conveniently fixed upon the body frame below the windshield structure, and thence to spaced apart capstans 88 of the manipulating and controlling mechanism. See Figs. 4, 20, 21, 22 and 26.

Figure 24:
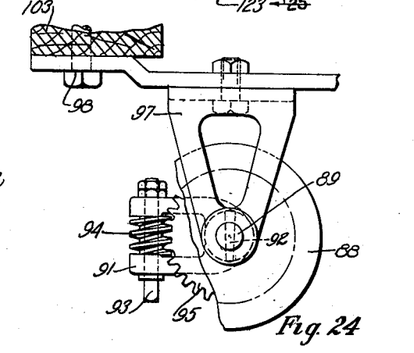
Fig. 24 is a fragmentary end view of the mechanism of Fig. 22, as seen from the left in said Fig. 22.
Figure 25:
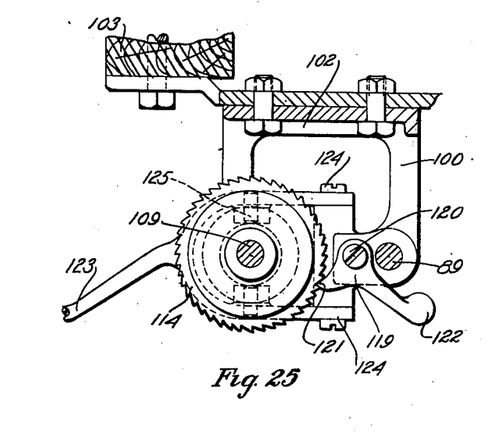
Fig. 25 is a fragmentary sectional view as on line 25—25 in Fig. 22.
Figure 26:
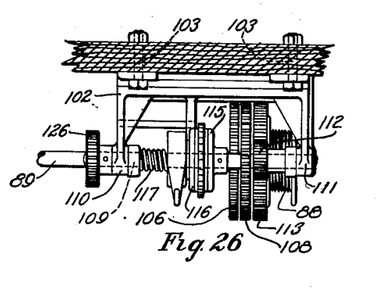
Fig. 26 is a detail view of a part of the roof manipulating and controlling mechanism taken from the position indicated by arrow 26 in Fig. 22.

The capstans 88 are fixed upon opposite end portions of a shaft 89 having a flexible joint 90 for the sake of convenience. One of the capstans (at the right in Fig. 22) is fixed directly to the shaft 89. The other capstan (at the left in Fig. 22) is secured to the shaft to be rotatably adjustable thereon when it is necessary to adjust the cables 46 to the same tension to exert equal pulling force upon the opposite guided edge portions of the roof, as will be understood. A yoke 91 fixed upon the shaft 89 at 92 suitably supports a hand shaft 93 including a worm 94 meshing with a worm wheel 95 fixed to the capstan and rotatable upon the shaft 89. While the intermeshing worm and worm wheel normally lock the capstan to the shaft 89, manipulation of the hand shaft in one direction rotates the capstan to tighten the corresponding cable, and manipulation of the hand shaft in opposite direction rotates the capstan to loosen said cable. See Figs. 22 and 24.

The end of the shaft 89 having the adjustable capstan is mounted as at 96 in a bracket 97 supported from the body frame as at 98. That portion of said shaft 89 having the fixed capstan is mounted in spaced apart extensions 99, 100 and 101 of a special bracket 102 also supports a motor 104 the driving shaft of which has a small gear 105 which meshes with a larger gear 106 freely rotatable upon the shaft 89. A small gear 107 upon the shaft 89 and integral with the gear 106 meshes with a larger gear 108 fixed upon a shaft 109 mounted in extensions 110 and 111 of the special bracket 102. A small gear 112 also fixed upon the shaft 109 meshes with a large gear 113 fixed upon the shaft 89. See Figs. 22, 23, 25 and 26.

As hereinbefore mentioned, it is the function of the windup roller to tend to wind up the roof in the housing 19 against the action of the roof manipulating mechanism. It will be clear that rotation of the motor shaft in proper direction will rotate, at reduced speed, the shaft 89, together with the capstans, against the action of the windup roller, and when the motor shaft is released, the windup roller will function to return the roof to the "open" position of the body.

Means is provided for locking the capstans in the "closed" position of the body, and for releasing said capstans to the action of the windup roller when this is intended. Numeral 114 denotes a ratchet wheel freely rotatable upon the shaft 109. 115 is a fixed element of a clutch upon said shaft 109 adjacent the ratchet wheel at one side thereof. 116 is a movable element of the clutch adjacent the ratchet wheel at opposite side thereof, the movable element being fixed against rotation upon the shaft 109, but being slidable longitudinally of said shaft. 117 is a coil spring about the shaft 109, between the movable element 116 and the bearing in the extension 110, normally pressing said movable element toward the ratchet wheel and the fixed element. 118 indicates cork faces of the fixed element 115 and the movable element 116 adapted to engage the opposite faces of the ratchet wheel. 119 is a pawl pivoted upon the extension 100 at 120 and engaging the teeth of the ratchet wheel at 121, the end of the pawl spaced from the ratchet wheel being weighted as at 122 to hold the pawl against the ratchet wheel.

The teeth of the ratchet wheel are set so that when the motor is operating the capstans to wind up the cables, the pawl rides over said teeth. At the end of the winding up operation, when the windup roller tends to withdraw the roof from its position over the frame of the body, the pawl engages back of a tooth of the ratchet wheel. The frictional engagement of the clutch, fixed against rotation upon the shaft 109, with the opposite faces of the ratchet wheel, locks said ratchet wheel to said shaft 109. Hence, the pawl and ratchet wheel engagement resists the tendency of the windup roller to remove the roof from its position over the frame.

A manually operable shipping lever 123 pivoted upon the extension 100 as at 124 is operatively associated with the movable element 116 of the clutch, as at 125, to be capable of shifting said element 116 away from the ratchet wheel, against the action of the coil spring 117. Clearly, so shifting the movable element of the clutch releases the ratchet wheel from the shaft 109, and allows the windup roller to function to withdraw the roof from the body frame and to wind up said roof about the hollow cylinder in the housing 19. When the shipping lever is released, the coil spring 117 again acts to cause the clutch to lock the ratchet wheel to the shaft 109.

A knurled finger piece 126 upon the shaft 109 can be employed to rotate the capstans.

It will be seen that the mechanism for converting the body from "open" to "closed" type and from "closed" to "open" type is constituted by simple, economical and dependable structure capable of being easily and quickly set to working condition, not liable to get out of working adjustment, and incorporating improved features rendering it wholly satisfactory and fool-proof.

Having thus fully described the invention, what we claim as new and desire to secure by Letters Patent is:

1. In combination, a removable automobile top, means to move said top into inoperative position, means to move said top to operative position, said last named means including a shaft, a shaft parallel with said shaft, an electric motor geared to said second shaft, gearing between said first and second shafts whereby the second shaft may drive the first shaft, ratchet means associated with the second shaft to prevent rotation of said shaft in one direction, a slip clutch frictionally connecting the ratchet with the second shaft, and means to shift said clutch to render said ratchet means inoperative whereby said shaft may move in said direction.

2. In combination, a removable automobile top, means to move said top into inoperative position, means to move said top to operative position, said last means including a shaft, a drum on said shaft, a cable having one end secured to said drum, means secured to the other end of the cable and normally operative to wind up the cable, a second shaft, an electric motor geared to the second shaft, gearing between the first and second shafts whereby the first shaft may be driven by the second shaft, ratchet mechanism on the second shaft normally operative to hold the shafts against rotation with the cable wound on the drum against the action of said means, a slip clutch on the second shaft and frictionally engaging the ratchet to secure the same to the shaft, and means for temporarily rendering inoperative said ratchet mechanism to permit said means to function to remove the cable from the drum, said means for rendering the ratchet inoperative including means for shifting the clutch away from the ratchet, and said clutch adapted to be brought into position to lightly engage the ratchet to retard movement thereof.

3. In combination, a removable automobile top, means to move said top into inoperative position, means to move said top to operative position, said last means including a shaft, a shaft parallel with said shaft, an electric motor geared to said second shaft, gearing between said first and second shafts whereby the second shaft may drive the first shaft, ratchet means associated with the second shaft to prevent rotation of said shaft in one direction, a slip clutch frictionally connecting the ratchet with the second shaft, means to temporarily render said ratchet means inoperative whereby said shaft may move in said direction, and said means for rendering the ratchet inoperative including means for shifting the clutch away from the ratchet, and said clutch adapted to be brought into position to lightly engage the ratchet to retard moment thereof.

4. In combination, a removable automobile top, means tending normally and adapted to move the top to inoperative position, means to move the top to operative position, said first means including a spring roller mechanism, and said second means including an electric motor, a shaft driven by said motor, a reducing gear train between the motor and the shaft whereby the motor will act to retard the action of the spring roller mechanism, and a slip clutch means adapted to perform as a brake to assist the retarding action of the motor.

5. In combination, a removable automobile top, means tending normally and adapted to move the top to inoperative position, means to move the top to operative position, said first means including a spring roller mechanism, and said second means including an electric motor, a shaft driven by said motor, means between the motor and shaft to lock the shaft against movement under the influence of the spring roller mechanism, and said means including a slip clutch means adapted to be moved to release the shaft to the action of the spring roller mechanism and adapted to be partially engaged to act as a friction brake on the action of the spring roller mechanism.

Signed at Bridgeport, in the county of Fairfield, and State of Connecticut, this 18 day of Feb. 1928.

SYLVANUS D. LOCKE.
HENRY J. STEGEMAN.